(12) United States Patent
Kleinman

(10) Patent No.: US 7,022,369 B1
(45) Date of Patent: Apr. 4, 2006

(54) METHOD OF PREPARING NUTRITIONAL LEGUME PRODUCT

(76) Inventor: Judee Kleinman, 7621 Fulton Ave., North Hollywood, CA (US) 91605

( * ) Notice: Subject to any disclaimer, the term of this patent is extended or adjusted under 35 U.S.C. 154(b) by 316 days.

(21) Appl. No.: 10/133,935

(22) Filed: Apr. 26, 2002

Related U.S. Application Data

(63) Continuation-in-part of application No. 09/569,594, filed on May 9, 2000, now abandoned.

(60) Provisional application No. 60/136,869, filed on Jun. 1, 1999.

(51) Int. Cl.
*A23L 1/20* (2006.01)

(52) U.S. Cl. ............. 426/634; 426/506; 426/507; 426/508; 426/629

(58) Field of Classification Search ............. 426/506, 426/507, 508, 634, 618, 629

See application file for complete search history.

(56) References Cited

U.S. PATENT DOCUMENTS

| 3,869,556 | A | * | 3/1975 | Rockland et al. | 426/634 |
|---|---|---|---|---|---|
| 4,465,696 | A | * | 8/1984 | Strahl | 426/63 |
| 4,859,486 | A | * | 8/1989 | Douglass | 426/629 |
| 4,927,660 | A | * | 5/1990 | Sano | 426/618 |
| 5,487,894 | A | * | 1/1996 | Kovacs | 424/750 |
| 5,972,413 | A | * | 10/1999 | Whitney et al. | 426/618 |
| 6,210,734 | B1 | * | 4/2001 | Jun | 426/523 |
| 6,602,534 | B1 | * | 8/2003 | Rose et al. | 426/507 |

OTHER PUBLICATIONS

Jethro Kloss, "The Back To Eden Cookbook", 1974, p. 61.*

* cited by examiner

*Primary Examiner*—Lien Tran
(74) *Attorney, Agent, or Firm*—Colin P. Abrahams

(57) ABSTRACT

A nutritional convenient food product which enhances and defeats endogenous anti-nutritive factors in a whole food or base product by processing the whole food product by initially cleaning and breaking dormancy of the product, soaking and germinating, followed by a final cleaning and further germinating with subsequent soaking, draining and rinsing. Full cooking follows with subsequent heating, then cooling the whole food product to ambient temperature.

4 Claims, 2 Drawing Sheets

METHOD OF PREPARING NUTRITIONAL LEGUME PRODUCT

This application is a CIP of application Ser. No. 09/569,594 filed on May 9, 2000, now abandon, which application in turn claimed priority to application No. 60/136,869 filed on Jun. 1, 1999.

BACKGROUND OF THE INVENTION

1. Field of the Invention

The present invention relates to the field of nutritional food products for humans, animals and fowl, and more particularly to a process and food product which is highly nutritional and more assimilable by employing soaking, germinating, sprouting and roasting techniques for legumes, grains, or the like so that nutritional value is increased and convenient access and handling of the product is enhanced.

2. Brief Description of the Prior Art

In the past, it has been the conventional practice to prepare food products for consumption by simply grinding a variety of gains by forming pellets, steaming and followed by cooling the ground product to the point where the product is dry and suitable for packaging and distribution. In so doing, neither temperatures nor cooling times are important other than to cook to a point where it is assimilable and cooling is normally at room temperature to the point where the product is dried and suitable for packaging. Although the processed food product is nutritious, certain nutritional value as well as flavor is lost in the lengthy conventional cooking process and cooling process which reduces the value of the product for human, animal or fowl use.

Therefore, a long-standing need has existed to provide a process and resultant food product which has increased nutritional value, digestibility and convenience. Such a product follows a process or procedure which includes grain germination and sprouting, followed by roasting so that augmented assimilative condition occurs, and packaging, distribution and use can be readily achieved.

SUMMARY OF THE INVENTION

Accordingly, the above problems and difficulties are avoided by the present method and product which greatly enhances nutrients in a base product such as a grain, seed, nut, or legume then fully roasting with heat so as to prevent proliferation of mold spores. The method of dry processing the base product includes preparing the product by placing approximately 50 or more pounds of product in a container which is initially prepared by cleaning to break dormancy and soaking, possibly in warm water, draining and rinsing. Next, a full germination is achieved by again soaking, draining and rinsing. After the final germination, the resulting product may be made more assimilable by heating to fully cook and roast. This reduces endogenous anti-digestive factors, as well as discordance with the digestive system. After cooling, the product is susceptible for convenient use by rehydrating.

Therefore, it is among the primary objects of the present invention to provide a novel procedure and convenient product for enhancing the nutrients in grain or other products such as nuts, beans, seeds, legumes, etc.

A further object of the present invention resides in producing a convenient, nutrient-enhanced and dehydrated food product for animals and fowl which has a long shelf life and which may be quickly rehydrated with broth or vegetable or fruit juices.

A further object resides in employing a process for improving the nutritional value of a raw product such as millet, milo, lentils, brown rice, corn, wheat, Adzuke beans, mung beans, seeds, nuts, barley, soybeans, black beans or the like by cleaning, sprouting, and roasting the product so as to reduce moisture in the product in order to enhance digestion and combat the growing of mold spores for commercial distribution.

Still a further object resides in providing a food product which approximates a natural, sprouted form of food as consumed in the wild.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF PREFERRED EMBODIMENT

Figure 1:
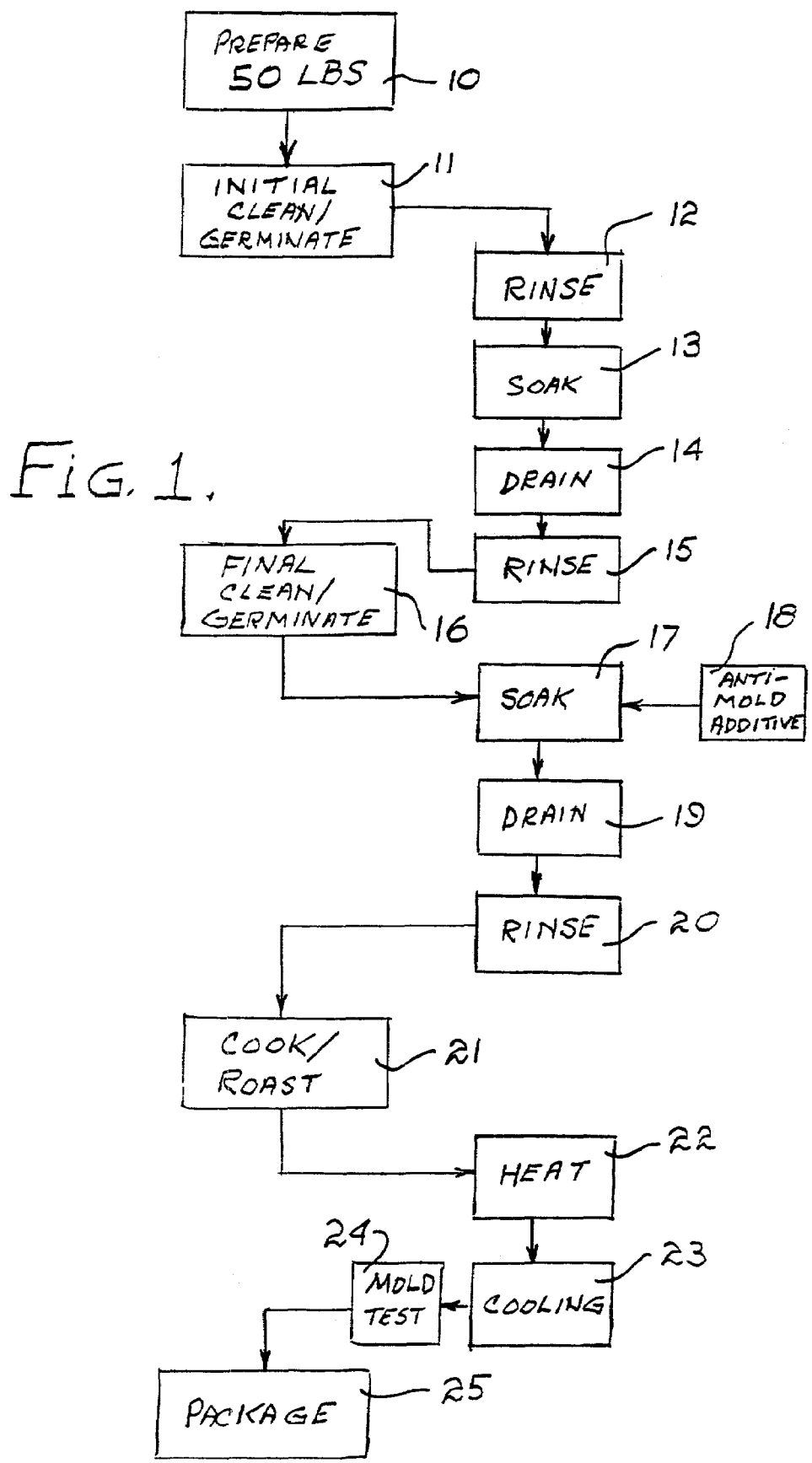
FIG. 1 is a block diagram diagrammatically illustrating the method or process for drying a raw product in order to produce the food product incorporating the present invention.

Referring to FIG. 1, the steps taken in order to perform the novel method or process of the present invention are illustrated wherein the first step is preparing the food product by selecting a single grain or combination of grains from such grains as black beans, millet, milo, lentils, brown rice, wheat, corn, mung beans Adzuke beans, barley, soybeans or any combination of additional grains, seed, legumes, etc. In some instances, the process is useful for preparing nuts or the like. Initially, the first step is to prepare 10 a quantity of the grains such as in 50 pound lots which are then initially cleaned 11. The cleaning, breaking dormancy step includes initially rinsing 12, soaking 13 the prepared product followed by draining 14 and then a rinse 15. This initial or first cleaning removes debris, foreign matter, and other undesirable substances. If necessary with certain foods, warm water may be used. To further insure cleanliness and germination, a second or final cleaning and germination step 16 is employed which includes adding an anti-mold agent 18, such as grapefruit seed extract, or other mold inhibitor, a second soaking 17, and a draining step 19 followed by a thorough and complete rinse 20.

Figure 2:
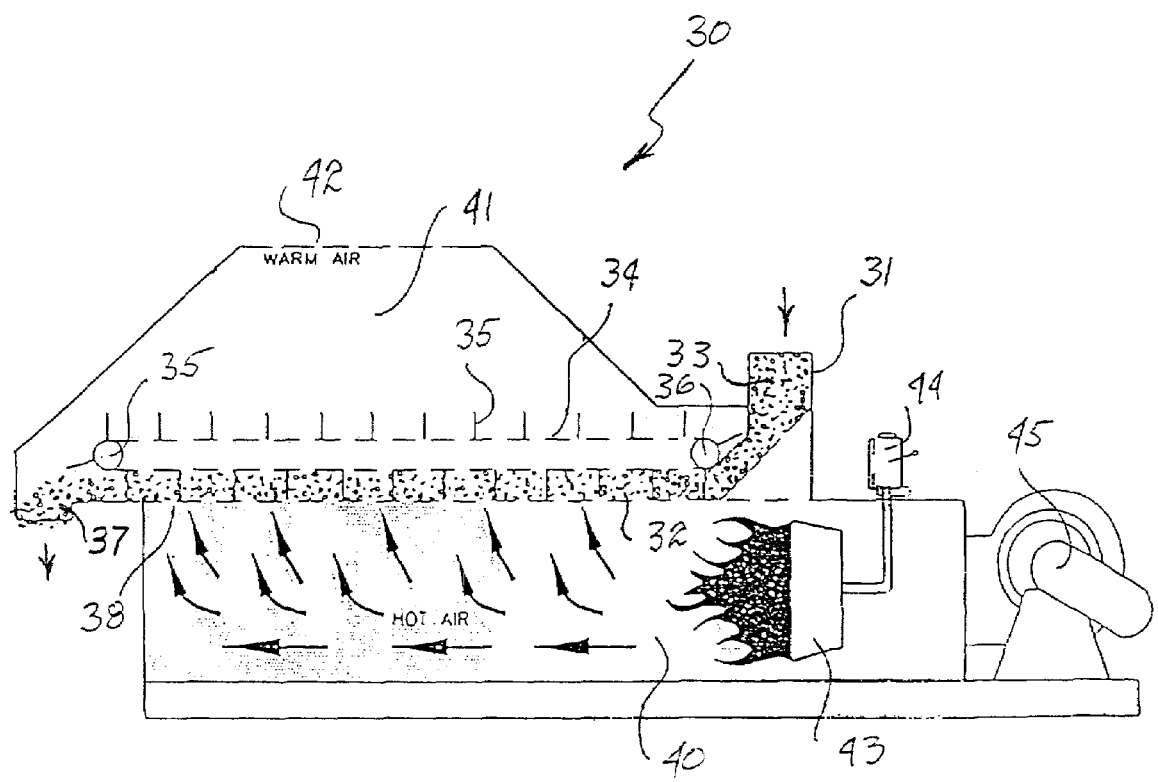
FIG. 2 is a diagrammatic illustration of an apparatus for substantially performing the major steps of the method or process.

Once the prepared product has been thoroughly cleaned and germinated through the initial and final cleaning steps, the processed and germinated product is subjected to a roasting, full-cooking step 21 at or within a temperature range of 215° Fahrenheit to 320° Fahrenheit by dry roasting in which warm air completely surrounds and also serves as a drying environment for the product, wherein the chamber 40 in FIG. 2 is an example. The cooking step 21 for certain food items includes an initial heating 22 constituting roasting, followed by a cooling step 23 which, in some cases, includes additionally cooking certain products in a closed barrel for approximately 40 minutes at 215°–240° Fahrenheit.

After cooling, the product is tested 24 for mold proliferation and when cleared, is packaged 25 for distribution and use. The testing step may include the use of a standard test for mold determination before packaging. If desired, the cooled and tested product may be frozen or freeze dried and vacuum packaged in a sprouted or germinated roasted condition prior to packaging and distribution. When distributed, the product is considered sprouted and a living food so as to provide maximum nutritional value, wherein the endogenous anti-nutritive elements have been reduced or eliminated.

For convenience, the product may be used for economically feeding needy people since the resultant product has a high ratio of digestibility and nutrition to density or volume for transportation, distribution and storage. After distribution, the product may be conveniently rehydrated utilizing hot water or a flavoring substance such as vegetable or fruit juice or, for increasing nutritional value, rehydration may take place utilizing a meat broth or the like. Long cooking, vitamin depleting, is unnecessary.

The starting raw material may take the form of grain, seeds, legumes, beans, peas, nuts and others wherein the ingredients may or may not be organic or inorganic. At various time sequences throughout the performance of the processing steps, checks and rechecks are made with appropriate adjustments for speed, flow, temperature and moisture content. Roasted germinated grains, beans, etc. may be cooked so the endogenous anti-digestive elements may be eliminated, enhancing digestibility and providing increased nutrient value. The product is thus nutrient enhanced and is ready to soak and serve in minutes versus days for conventional processing methods. The consumer may hydrate to make the product soft after removing from the package.

A 3-day supply can be soaked and refrigerated prior to use for added convenience. The product has a very long shelf life. It may be used as a nutrient enhanced snack, a food, a cereal, or the like. It may be sold as a plain grain or mixture in combination. It may be ground into flour or for manufacturing pastas or for baked products, such as crackers, breads, biscuits, or the like. Crumbles, or pelleted animal feed may be made from the product. Seasonings, vitamins, dehydrated vegetables and fruits, herbs and other flavoring may be employed to enrich the product after the cooling process. In particular, the grains may be sold in packets, bags or bulk sacks for nutrition dense (economical) packaging for humans, or the feeding of animals or fowl such as pets or wild birds, small or large pet animals. Being nutrient dense is useful and economical in cattle, pork, poultry, egg, meat and feed industries, as well as human famine relief.

As illustrated in FIG. 2, an apparatus is illustrated in the general direction of arrow 30 for processing the raw product in accordance with the previously described method or process. Initially, a hopper 31 is provided into which the raw product is placed after filtering, pouring or the like. The hopper is connected to an elongated horizontal shoot or passageway 32 where the raw material, indicated by numeral 33, is pushed or transported by a conveyor means, broadly indicated by numeral 34. The conveyor may include a plurality of spaced-apart walls or partitions, such as wall 35, and the conveyor is trained about wheels 35 and 36 which are employed to operate the belt or conveyor in an endless circle about the apparatus. It can be seen that the travel of the raw product from the hopper to an exhaust or discharge nozzle 37 occurs between the apertured platform 38 and the underside of the conveyor belt 34. The material is pushed along so that hot air in a combustion chamber 40 is directed through the raw material and into a warm air chamber 41 for exhaust through vents 42. The hot air in the combustion chamber 40 is derived from a burner 43 which is under control of a controller 44. A fan 45 supplies oxygen or air to the burner 43 and forcibly urges the conduct of the hot air through the combustion chamber into immediate and surrounding contact with the raw product as it passes along the passageway between the inlet 31 and the discharge nozzle 37. In this manner, the raw product is thoroughly heated, dehydrated, and for certain items, roasted. It is discharged from the nozzle 37.

The miraculous nutritional augmentation of proteins, minerals, and vitamins A, B, B12, B17, C, E, D, et. al., variously occurs within a legume or other seed or grain at the moment of germination and beyond into sprouting. Starches are converted into simple sugars, protein into amino acids, and oils changed to soluble compounds. However, despite the improved sprouted state, these benefits are not fully assimilable due to endogenous substances in legumes, which are antagonistic to digestion or indigestible, resulting in gas from fermentation of indigestible proteins, etc. Anti-digestive factors may include saponins, glycosides, alkaloids, conjugates of protein with phytin or hemicellulose and substances which inhibit the action of the protein digestive enzyme trypsin. Phytic acid intrinsically present may affect the absorption and utilization of legumes' calcium through precipitation of insoluble salts in the stomach and duodenum. Soybeans contain a trypsin-inhibitor in greater quantities than other legumes, retarding the liberation from protein of the amino acid methionine. So methionine cannot be effectively used for protein synthesis. Thus soybeans, unless cooked for several hours, will not support the normal growth in rats.

Several other heat-labile factors in legumes may have a growth inhibiting effect, when extremes of heat damage legume proteins, destroying for example the amino acids lysine and cystine.

Both alpha-amylase inhibitors (in cereals and legumes) and trypsin inhibitors (primarily in legumes) are not fully denatured by cooking. Commercially available edible soybean products, for example, retain 5–20% of the trypsin inhibitor activity originally present in the raw soybean.

The need for improved digestibility of legumes also exists because the human digestive track has only recently evolutionarily (125,000 years or so since the development of fire) been exposed to cooked beans. Prior to that, the mature beans from pods, which are toxic in their raw state, could not have been digested by hunter gatherers. Today, sufficient anatomical and physiological adaption exists to completely digest legumes after either a normal cooking process, or in a sprouted state. Likewise, grain digestion in the primate digestive system, is not necessarily assured. We may not break down all the walls in raw grains despite cereal grains being milled and cooked to crystallize the starch granules. Thus the proteins and carbohydrates in raw grains are largely unavailable for absorption and assimilation. Phytates in raw cereal bind virtually all divalent ions, i.e. minerals, resultant health problems occurring from a diet with over 50–60% total dietary calories from cereal. Problems include rickets, retarded skeletal growth, hypogonadal dwarfism, iron deficiency anemia, pellagra, beri-beri, catastrophic effects on the gastrointestinal tract, and more.

Our novel and futuristic process will assist in defeating both the inherent anti-digestive properties of legumes, raw grains, etc. and the evolutionary discordance with the human gut. It will provide foods with enhanced nutrient content by a natural germination and sprouting process plus the essential subsequent full gentle low heat cooking. This will yield a compact, nutrient dense easy, economical and convenient new food source with the benefit of increased assimilability beyond regular sprouts, cooked beans, or raw grains. We also eliminate the previously necessary long cooking process with its resultant killing of water soluble vitamins thiamine, niacin, pyridoxine, pantothenic acid, bioflavin, vitamin C, etc.

Our resultant food items can be used plain, rehydrated, enriched with additives, ground into flour, pellets, et. al, for the animal, fowl and human populations.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A method of preparing a whole nutritional food product in the form of a legume, the steps comprising:
   initially cleaning the legume product by rinsing;
   germinating and sprouting the cleaned legume by soaking in water resulting in sprouting and breaking dormancy;
   draining of the germinated and sprouted legume;
   rinsing of the drained, germinated and sprouted legume;
   cleaning of the rinsed legume by additional rinsing;
   further germinating the legume by repeating the steps of soaking, draining and rinsing of the legume to boost nutritional value;
   roasting the cleaned and germinated legume at 215° F. to 300° F. to produce dry roasted legume for digestibility; and
   cooling the roasted, and sprouted legume by permitting the legume to cool to ambient temperature.

2. A method of enhancing the nutritional value and convenience in a legume comprising the steps of:
   placing at least 50 pounds of a legume into a hopper;
   adding a quantity of water to the placed legume for soaking and sprouting, followed by thoroughly rinsing to clean and to break dormancy of the legume for enhancing nutritional value;
   draining the cleaned and rinsed legume;
   rinsing the drained legume;
   repeating the steps of adding water, soaking, cleaning, draining and rinsing the legume to effect final sprouting, breaking of dormancy, and nutritional enhancement;
   roasting the sprouted legume by employing heated air to fully cook the sprouted legume;
   cooling the sprouted, roasted and fully cooked legume;
   testing the cooked legume for presence of mold; and
   packaging of the fully cooked legume for distribution.

3. A method of enhancing the nutritional value and convenience in a legume comprising the steps of:
   placing at least 50 pounds of a legume into a hopper;
   adding a quantity of water to the placed legume for cleaning by soaking and sprouting by breaking dormancy, followed by thoroughly rinsing to further clean;
   draining the cleaned and rinsed legume;
   rinsing the drained legume for a second time by repeating the steps of adding water, soaking, cleaning, draining and rinsing of the legume to effect nutritional enhancement;
   adding an anti-mold agent to the rinsed and sprouted legume;
   roasting the sprouted legume by employing heated air by fully cooking the legume to produce a dry roasted legume within a temperature range of 215° F. to 320° F., after the final repeated steps to produce the nutritionally enhanced legume;
   treating the sprouted, roasted and fully cooked nutritionally enhanced legume by placing in a closed barrel for 30 to 50 minutes at a temperature within the range of 230° F. to 250° F.;
   cooling and testing the roasted legume for presence of mold; and
   vacuum packaging of the nutritionally enhanced legume in a sprouted and germinated condition for distribution.

4. A method of preparing a whole nutritional food product in the form of a legume, the steps comprising:
   cleaning the legume by rinsing;
   germinating, sprouting and breaking dormancy of the cleaned legume by soaking in water;
   draining and rinsing the germinated and sprouted legume;
   roasting the legume at 215° F. to 300° F. to produce a dry roasted legume; and
   cooling the roasted legume by permitting the legume to cool to ambient temperature.

* * * * *